United States Patent
Sheppard et al.

(10) Patent No.: US 10,089,358 B2
(45) Date of Patent: Oct. 2, 2018

(54) METHODS AND APPARATUS TO PARTITION DATA

(71) Applicant: The Nielsen Company (US), LLC, New York, NY (US)

(72) Inventors: Michael Sheppard, Brooklyn, NY (US); Jonathan Sullivan, Hurricane, UT (US); Peter Lipa, Tucson, AZ (US); Alejandro Terrazas, Santa Cruz, CA (US)

(73) Assignee: The Nielsen Company (US), LLC, New York, NY (US)

(*) Notice: Subject to any disclaimer, the term of this patent is extended or adjusted under 35 U.S.C. 154(b) by 433 days.

(21) Appl. No.: 14/860,361

(22) Filed: Sep. 21, 2015

(65) Prior Publication Data

US 2017/0083580 A1    Mar. 23, 2017

(51) Int. Cl.
    *G06F 17/30*    (2006.01)
(52) U.S. Cl.
    CPC .. *G06F 17/30489* (2013.01); *G06F 17/30371* (2013.01)
(58) Field of Classification Search
    CPC ......... G06F 17/30598; G06F 17/30498; G06F 17/30371; G06F 17/30489
    See application file for complete search history.

(56) References Cited

U.S. PATENT DOCUMENTS

| | | | |
|---|---|---|---|
| 6,424,969 B1* | 7/2002 | Gruenwald | G06F 17/30569 |
| | | | 707/802 |
| 6,629,097 B1* | 9/2003 | Keith | G06F 17/30598 |
| 7,181,438 B1 | 2/2007 | Szabo | |
| 7,720,846 B1* | 5/2010 | Bayliss | G06F 17/30598 |
| | | | 707/736 |
| 7,970,592 B2 | 6/2011 | Behrens et al. | |
| 8,014,395 B1 | 9/2011 | Aggarwal et al. | |
| 8,112,301 B2 | 2/2012 | Harvey et al. | |
| 8,543,523 B1 | 9/2013 | Palit et al. | |
| 8,572,019 B2 | 10/2013 | Eggers et al. | |
| 8,935,247 B1 | 1/2015 | Tholome et al. | |
| 8,983,959 B2 | 3/2015 | Isaacson et al. | |
| 9,330,163 B2* | 5/2016 | Fan | G11B 27/32 |
| 2008/0270363 A1* | 10/2008 | Hunt | G06F 17/30489 |
| 2008/0288889 A1* | 11/2008 | Hunt | G06Q 30/02 |
| | | | 715/810 |
| 2008/0319829 A1* | 12/2008 | Hunt | G06Q 30/02 |
| | | | 705/7.29 |
| 2009/0006156 A1* | 1/2009 | Hunt | G06Q 10/063 |
| | | | 705/7.11 |
| 2009/0018996 A1* | 1/2009 | Hunt | G06Q 30/02 |

(Continued)

*Primary Examiner* — Shiow-Jy Fan
(74) *Attorney, Agent, or Firm* — Hanley, Flight & Zimmerman, LLC

(57) ABSTRACT

Methods and apparatus to partition data are discloses. An example method includes generating, with a processor, an indicator matrix for a set of panelist data based on a set of matrix criteria corresponding to the panelist data. The entries in the indicator matrix are determined based on a conditional probability of a panelist having one or more characteristics. An indicator is placed in a panelist vector of the matrix if the panelist has the one or more characteristics. A set of unique panelist vectors is determined and redundant panelist vectors that are not unique are removed to determine a minimum set of mutually exclusive partitions of the panelist data.

20 Claims, 6 Drawing Sheets

(56) References Cited

U.S. PATENT DOCUMENTS

| | | | |
|---|---|---|---|
| 2011/0016124 A1* | 1/2011 | Isaacson | H04L 9/0894 |
| | | | 707/737 |
| 2011/0264617 A1* | 10/2011 | Eggers | G06F 17/30598 |
| | | | 706/50 |
| 2013/0197975 A1 | 8/2013 | Miller et al. | |
| 2014/0098886 A1 | 4/2014 | Crenshaw et al. | |
| 2014/0188554 A1 | 7/2014 | Harter et al. | |

* cited by examiner

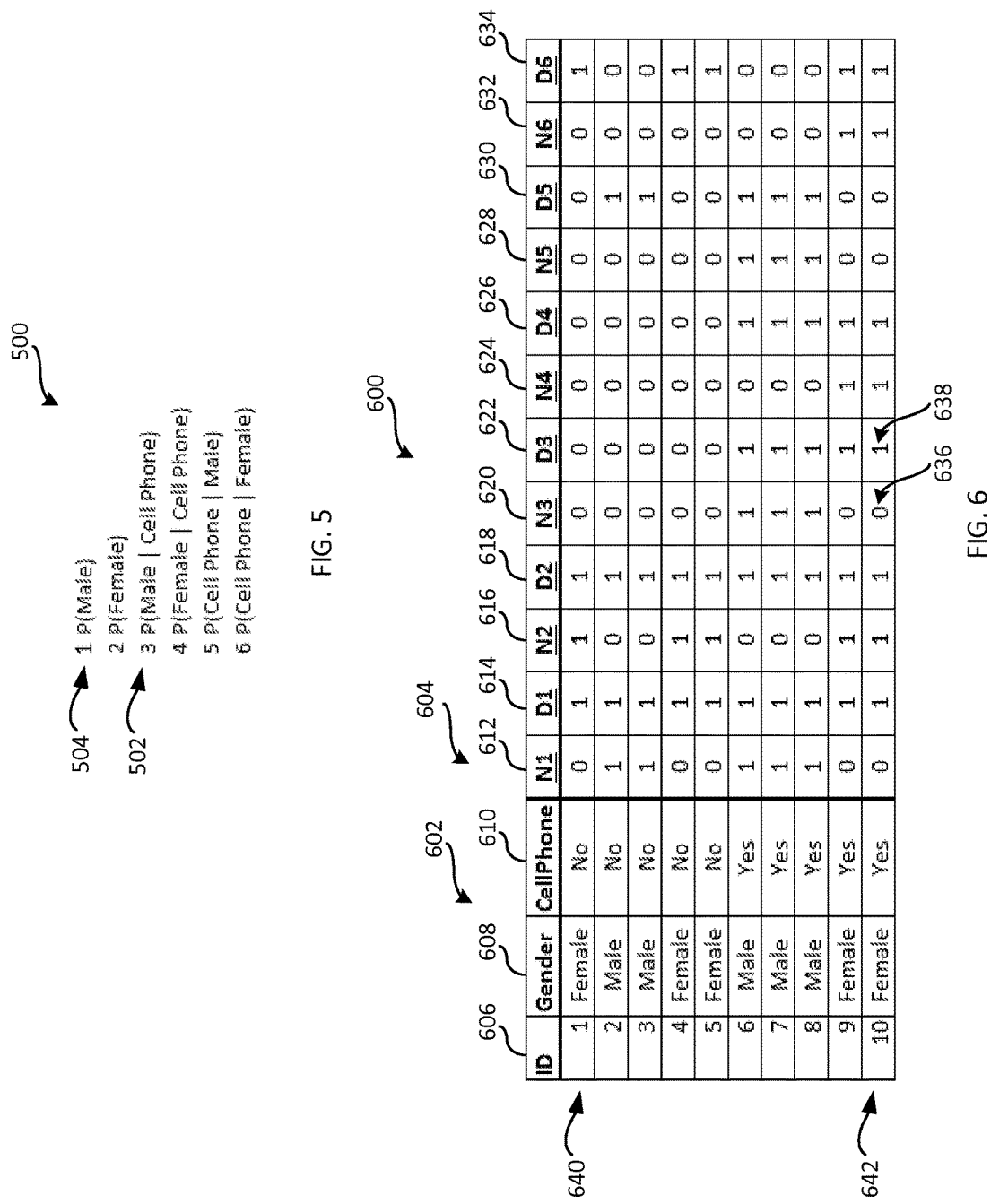

| Label | N1 | D1 | N2 | D2 | N3 | D3 | N4 | D4 | N5 | D5 | N6 | D6 |
|---|---|---|---|---|---|---|---|---|---|---|---|---|
| A | 1 | 1 | 0 | 1 | 0 | 0 | 0 | 0 | 0 | 1 | 0 | 0 |
| B | 1 | 1 | 0 | 1 | 1 | 1 | 0 | 1 | 1 | 1 | 0 | 0 |
| C | 0 | 1 | 1 | 1 | 0 | 0 | 0 | 0 | 0 | 0 | 0 | 1 |
| D | 0 | 1 | 1 | 1 | 0 | 1 | 1 | 1 | 0 | 0 | 1 | 1 |

FIG. 7

| ID | Gender | CellPhone | Label |
|---|---|---|---|
| 1 | Female | No | C |
| 2 | Male | No | A |
| 3 | Male | No | A |
| 4 | Female | No | C |
| 5 | Female | No | C |
| 6 | Male | Yes | B |
| 7 | Male | Yes | B |
| 8 | Male | Yes | B |
| 9 | Female | Yes | D |
| 10 | Female | Yes | D |

FIG. 8

| ID | Gender | CellPhone | Label |
|---|---|---|---|
| 6 | Male | Yes | B |
| 7 | Male | Yes | B |
| 8 | Male | Yes | B |

FIG. 9

| Label | Description |
|---|---|
| A | Male + no Cell |
| B | Male + Yes Cell |
| C | Female + No Cell |
| D | Female + Yes Cell |

FIG. 10

METHODS AND APPARATUS TO PARTITION DATA

FIELD OF THE DISCLOSURE

This disclosure relates generally to data segmentation and, more particularly, to methods and apparatus to partition panelist data.

BACKGROUND

Market research groups collect data to evaluate the market for certain products and determine how the demographics of a population may affect the market. To collect such research data, market researchers may employ a group of selected participants (known as panelists) to provide data, such as demographic data, media exposure data, and/or other data related to the market research. Each panelist may be selected such that the plurality of panelists is an accurate scale representation of one or more larger populations that a market researcher is studying. Because the research data from the panelists is based on a relatively small group of people, inaccuracies sometimes exist in scaling the data from the panelists to the larger population of interest. To decrease the effect of these inaccuracies as the market research is applied to the larger population(s), the research data may be processed, for example, by weighing certain groups of panelists differently than other groups of panelists.

BRIEF DESCRIPTION OF THE DRAWINGS

FIG. 5 is an example set of matrix criteria that may be received by the example data partitioner of FIG. 1.

FIG. 6 is an example indicator matrix that may be generated by the example indicator matrix generator of FIGS. 1 and/or 2.

FIG. 7 is an example set of partitioned data that may be determined by the example data partitioner of FIG. 1.

FIG. 8 is an example set of panelist data that is matched in accordance with the partitions of FIG. 7.

FIG. 9 is an example set of panelist data that is sorted in accordance with the partitions of FIG. 7.

FIG. 10 illustrates an example set of partition descriptions.

Wherever possible, the same reference numbers will be used throughout the drawing(s) and accompanying written description to refer to the same or like parts.

DETAILED DESCRIPTION

Figure 1:
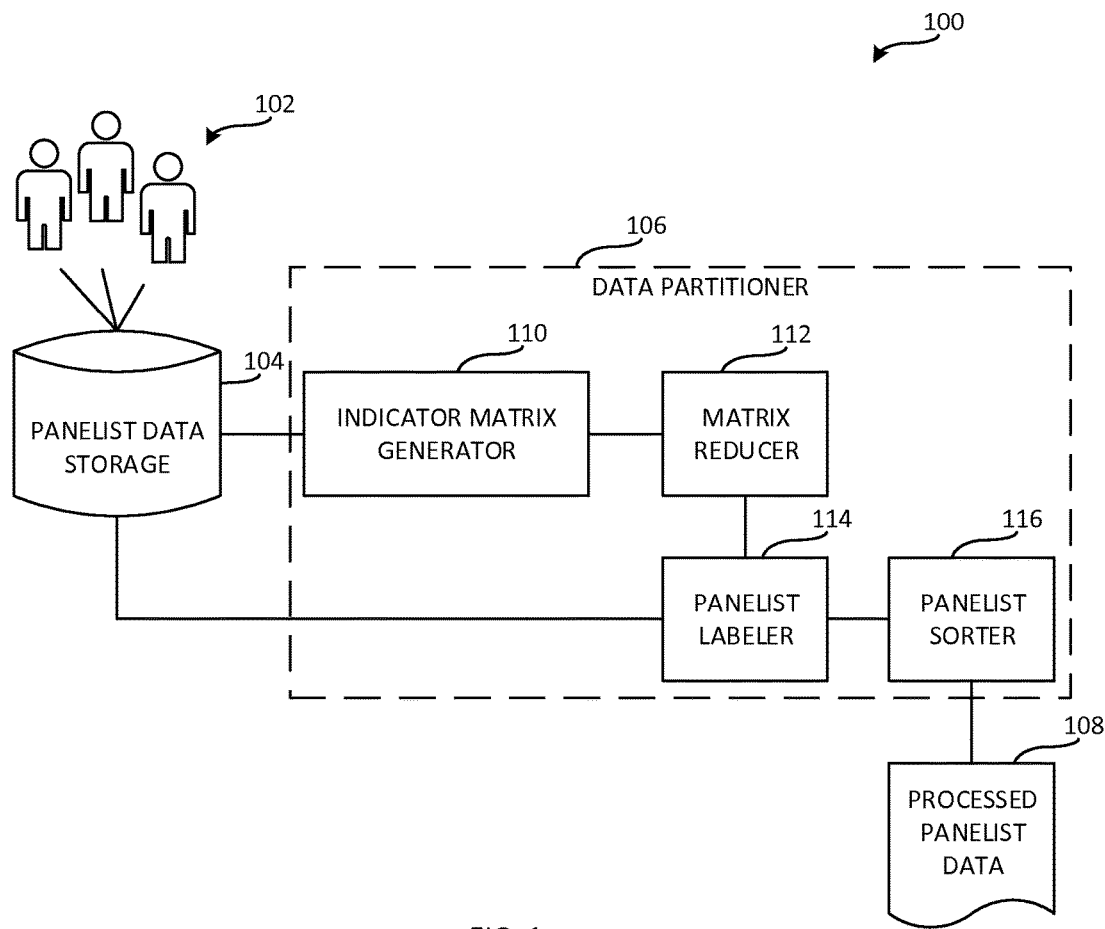
FIG. 1 is a block diagram of an example environment in which an example data partitioner constructed in accordance with the teachings of this disclosure operates to partition panelist data based on input criteria.

Example methods and apparatus disclosed herein construct a minimum set of mutually exclusive partitions of panelist data based on an identification of matrix criteria to be studied. In some examples, responses to all matrix criteria being studied are represented by (e.g., can be determined from) the minimum set of mutually exclusive partitions. The matrix criteria may be represented by probabilities that evaluate the panelist for one characteristic and/or conditional probabilities that evaluate the panelists for one characteristic given another characteristic. For example, a matrix criterion may be the conditional probability that a panelist is male given that the panelist has a cell phone (e.g., represented as P(Male|Cell Phone)), where "male" is a first characteristic (e.g., an event) and "cell phone" is a second characteristic (e.g., a condition).

As used herein, the term "event" refers to the tested portion of the probability (e.g., Male is the event in the following probabilities: P(Male) and P(Male|Cell Phone). As used herein, the term event is not limited to happenings or occurrences, but rather includes anything (e.g., occurrence, trait, attribute, etc.) that may be tested by a probability. For example, an event as used herein may include a characteristic of a panelist such as an age, gender, income, etc. or may be a behavior (e.g., purchase behavior, media access behavior, etc.) As used herein, the term condition refers to the second half of a condition probability (e.g., the portion to the right of the "|"). In the following disclosure, the term condition may also be referred to as the "given" or the "given characteristic."

As used herein, a minimum set of mutually exclusive partitions is the set including the least number of groupings of panelist attributes that may be used to calculate the probabilities (e.g., including conditional probabilities) included in received matrix criteria. For example, if data regarding two characteristics is collected (e.g., gender of the panelist and whether or not the panelist has a cell phone), the mutually exclusive partitions include all possible outcomes present in the sample population (e.g., male with cell phone, male without cell phone, female with cell phone, and female without cell phone). However, if, for example, the only matrix criterion to be studied is P(age>20|Cell Phone), the matrix criterion can be determined with knowledge of the number of panelists older than 20 with cell phones and the total number of persons (e.g., the sum of the number of all panelists). Thus, in such an example, the minimum set of mutually exclusive partitions would be a partition including panelists older than 20 with a cell phone and a partition including panelists 20 or younger with a cell phone and panelists without a cell phone.

In some examples, after determining the minimum set of mutually exclusive partitions, the full set of data for the panelists may be discarded in favor of retaining the data for the minimum set of mutually exclusive partitions (e.g., a data set having 10,000 elements (e.g., 1000 panelist partitions each having 10 data elements for a total of 10,000 elements) may be reduced to, for example, four elements that may be used to analyze two matrix criteria).

An example apparatus to partition data as disclosed herein may receive data corresponding to a plurality of panelists and store the data in a panelist data storage device. Some such example apparatus also include an indicator matrix generator to generate an indicator matrix from which the mutually exclusive partitions are determined. In some examples, the example indicator matrix generator includes a parameter definer to define the matrix parameters of the indicator matrix based on the panelists and the matrix criteria received by the example apparatus. The example indicator matrix generator of some examples also includes a criteria analyzer to determine if the panelists meet the matrix criteria and an element and vector positioner to place an indicator in a vector of the indicator matrix corresponding to a matrix criterion if the panelist meets the matrix criterion. Any indicators placed in a matrix criterion vector by the element and vector positioner will correspond to the panelist being analyzed by the criteria analyzer.

The example apparatus of some examples also includes a matrix reducer to reduce the indicator matrix to the minimum set of mutually exclusive partitions. Some such example apparatus also include a panelist labeler to label the partitions (e.g., A, B, C, D, etc.). In some examples, the apparatus includes a panelist sorter to sort the panelists into mutually exclusive partitions corresponding to the matrix criteria met by each panelist. In some examples, the number of panelists sorted into each mutually exclusive partition is determined.

Example methods disclosed herein include receiving panelist data from a panelist data storage device, generating an indicator matrix, determining mutually exclusive partitions from the generated indicator matrix, assigning each mutually exclusive partition a label, matching each panelist to a corresponding mutually exclusive partition, assigning labels to the panelists corresponding to the mutually exclusive partition to which each panelist was matched, and sorting the panelists according to the assigned label. Some such example methods define the indicator matrix parameters, determine if a given panelist meets a given matrix criterion, and place an indicator in the corresponding position in the indicator matrix if the panelist meets the given matrix criterion. In some example methods, generating the indicator matrix is repeated for each combination of panelist and matrix criterion to populate the indicator matrix.

FIG. 1 is a block diagram of an example environment 100 in which an example data partitioner 106 may be utilized to partition panelist data. The example environment 100 includes a plurality of example panelists 102 from which panelist data is collected. The collected data is stored in an example panelist data storage device 104. The example environment 100 also includes an example data partitioner 106 to analyze the panelist data in the example panelist data storage device 104 and produce processed panelist data 108.

As used herein, panelist data includes any information collected about the example panelists 102 (e.g., demographics, behaviors, etc.). In some examples illustrated herein, the information is represented as Boolean, categorical, or ordinal data sets. In some examples including data sets with real numbers, brackets are created (e.g., an age bracket of 18-24, an age bracket 25-35, etc.). For example, the panelist data may include characteristics of the panelist such as, for example, demographic information, product preferences, television viewing preferences, product ownership information, etc. For example, demographic information may be collected at the time of panelist registration. In some examples, demographic information includes gender, age, income, location, presence of children, ownership of a device, etc. Other information included in the panelist data, such as product preferences and television viewing preferences, may be collected during panelist registration by requesting that the panelists complete a survey and/or by automated media measurement device(s) associated with the panelist(s) 102, such as the portable meter.

The example plurality of panelists 102 may include any number of panelists representative of a target population. In the illustrated example, panelist data is collected from the example panelists 102 using portable meters that have been given to the panelists 102 for the purpose of data collection. In some examples, each panelist 102 is respectively assigned a portable meter. In some examples, the portable meters may be integrated into a mobile device (e.g., a cellular phone) carried by the panelists 102. In other examples, the portable meter may be a wearable device, such as a watch. Alternatively, the panelist data may be collected via surveys sent to the panelists 102. In some such examples, the surveys may be sent to the panelists 102 via the Internet (e.g., email), physical mailing, etc. In other examples, the panelist data may be collected through other measurement devices and/or methods, such as by collection of data from set top boxes utilized by the example panelists 102.

The panelists 102 of the example of FIG. 1 are users registered on panels maintained by a ratings entity (e.g., an audience measurement company) that owns and/or operates the ratings entity subsystem. Traditionally, audience measurement entities (also referred to herein as "ratings entities") determine demographic reach for advertising and/or media programming based on registered panel members. That is, an audience measurement entity enrolls people that consent to being monitored into a panel. During enrollment, the audience measurement entity receives demographic information from the enrolling panelists so that determinations can be made about the composition of the audience experiencing the advertisement/media exposure, the effectiveness of the advertisements, and/or the behavior of the audience members.

Panelists 102 may be enrolled in the panel via, for example, a user interface presented on a media device (e.g., via a website). Panelists 102 may be enrolled in the panel in additional or alternative manners such as, for example, via a telephone interview, by completing an online survey, random selection, statistical selection, phone solicitations, Internet advertisements, surveys, advertisements in shopping malls, product packaging, etc.

The example panelist data storage device 104 of the example of FIG. 1 is a server operative to collect data (including panelist data) from the example portable meters carried by the example panelists 102. The example panelist data storage device 104 of FIG. 1 is in communication with the example panelists 102 (e.g., with portable meters carried by the example panelists 102) via either a wired connection or via a wireless connection, such as wireless Internet, Bluetooth, Near Field Communication (NFC), or RFID (Radio Frequency Identification), etc. Alternatively, the panelist data storage device 104 may be implemented by a database, a hard drive, hard disk, or any other type of tangible computer readable medium, such as a compact disk or flash drive. The example panelist data storage device 104 may be in communication with the example data partitioner 106 to facilitate analysis of collected panelist data by the example data partitioner 106.

As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

The data partitioner 106 of the illustrated example of FIG. 1 analyzes panelist data collected from the example panelists 102 to partition the panelist data into mutually exclusive partitions. In the illustrated example, matrix criteria are provided to the example data partitioner 106 as input from a user of the example data partitioner 106 (e.g., an administrator of a study). In other examples, the data partitioner 106 may determine the matrix criteria based on the given set of panelist data by, for example, determining characteristics that many of the example panelists 102 have in common.

As used herein, the term matrix criteria refers to a set of one or more matrix criterion (e.g., a single matrix criterion, multiple matrix criterion, etc.) that is used to evaluate a set of panelist data. As used herein, a matrix criterion is a probability or a conditional probability that a panelist has one or more characteristics. As used herein, a characteristic is an attribute of the panelist data to be evaluated. For example, a probability may include two characteristics (e.g., P(first characteristic|second characteristic). In some such examples, the first characteristic may be referred to as an event and the second characteristic may be referred to as a condition (e.g., P(event|condition). The terms first characteristic and event may be used interchangeably and likewise, the terms second characteristic and condition may be used interchangeably. As used herein, an attribute of a panelist is any information about a panelist (e.g., demographics, behavior, etc.) or otherwise associated with a panelist. For example, an attribute may be demographic information about a panelist, an answer that the panelist provided in response to a survey, a purchase behavior, an activity, a preference, etc. In some examples, the event and/or the condition may include one or more attributes to be evaluated (e.g., gender and age).

In the illustrated example, the matrix criteria provided to the data positioner are represented as probabilities including only one characteristic (e.g., P(Male). In such examples, the characteristic is referred to as the event. In other examples, the matrix criteria provided to the data partitioner 106 are represented as conditional probabilities (e.g., P(Male|Cell Phone)) and the matrix criteria includes two characteristics (e.g., male, cell phone) the user wishes to evaluate for the panelist data. For example, the first characteristic (e.g., male) may be the event of the probability and the second characteristic (e.g., whether the panelist has a cell phone) may be the condition of the probability. In examples where the characteristic(s) includes more than one attribute to be evaluated, the matrix criteria may be represented as, for example, P(Male∩age<20|Cell Phone). In this example, the event (e.g., male and age is less than 20) includes two attributes of the panelist. Other examples where the characteristic(s) include more than one attribute may include P(Male∩Cell Phone), P(Male|Cell Phone∩age<20), include P(Male∩location=USA|Cell Phone∩age<20), P(Male∪age<20|Cell Phone), etc.

To partition the panelist data stored in the example panelist data storage 104, the example data partitioner 106 creates an indicator matrix based on the matrix criteria received by the example data partitioner 106. The indicator matrix includes a panelist vector for each panelist of the plurality of panelists 102. In the illustrated example, the panelist vector includes an indicator for each of the event and the condition of each matrix criterion in the set of matrix criteria. If a matrix criterion includes only an event (e.g., a probability such as P(Male) that is not a conditional probability), the panelist vector includes a first indicator for the event and a second indicator for the condition, which evaluates as true for all panelists in the set of panelists. The example data partitioner 106 of FIG. 1 reduces the indicator matrix to a set of unique vectors, which corresponds to a minimum set of mutually exclusive partitions. The example data partitioner 106 of FIG. 1 also assigns a label (e.g., A, B, C, or D) to each unique vector and assigns a corresponding label to each panelist vector. The example data partitioner 106 sorts the example panelists 102 based on the corresponding label assigned to the panelist vector corresponding to each of the panelists 102.

In further detail, the example data partitioner 106 of FIG. 1 includes an example indicator matrix generator 110, an example matrix reducer 112, an example panelist labeler 114 and an example panelist sorter 116.

The example indicator matrix generator 110 of FIG. 1 generates the indicator matrix based on collected data for the plurality of panelists 102 and the given matrix criteria. An example indicator matrix 604 is shown and described in more detail in conjunction with FIG. 6. The indicator matrix generator 110 of the example defines the matrix parameters of the indicator matrix, evaluates each of the panelists 102 based on the provided matrix criteria and the corresponding panelist data, and places an indicator, such as indictor 636 or indicator 638 of FIG. 6, in the corresponding location of the panelist vector in the indicator matrix. An example panelist vector 640 is shown in the example indicator matrix 604 of FIG. 6. As used herein, a matrix parameter is the number of rows and/or columns in the indicator matrix (e.g., a two dimensional indicator matrix may have two matrix parameters (a first matrix parameter identifying the number of rows and a second matrix parameter identifying the number of columns)). Thus, defining the matrix parameters of the indicator matrix includes determining the number of rows and columns needed to input each of the panelists for the given set of matrix criteria in the indicator matrix. The example panelist vectors include an indication of whether a corresponding panelist fulfils each of the given matrix criteria. If two characteristics exist in a matrix criterion, the indicator matrix generator 110 evaluates the matrix criterion by determining the probability of whether or not each of the panelists 102 fulfills the event, given the condition (e.g., out of the panelists who fulfill the condition, which also fulfill the event). Thus, the example indicator matrix generator 110 of FIG. 1 generates an indicator matrix where the panelist vector corresponding to each of the panelists 102 includes two indicators for each evaluated matrix criterion.

In the illustrated example, each of the matrix criteria evaluated by the example indicator matrix generator 110 and represented in the indicator matrix is assigned two indicators per panelist. The first indicator corresponds to whether the panelist fulfills the condition (e.g., the second characteristic) and the second indicator corresponds to whether the panelist fulfills both the event and the condition (e.g., has both the characteristics). If only one characteristic (e.g., the event) is defined by a matrix criterion, the example indicator matrix generator 110 evaluates the matrix criterion by determining whether or not each of the panelists 102 has that characteristic. In such cases where there is only one characteristic in a matrix criterion, the condition is whether the panelist is a part of the sample (e.g., if the panelist is in the universe), which is a characteristic of every panelist being evaluated and thus every panelist would include an indicator that indicates that they are included in the set.

The evaluation of the matrix criteria by the example indicator matrix generator 110 includes two possible outcomes for each component (e.g., the event and the condition) of each matrix criterion: (1) yes, the panelist has the characteristic(s) and meets the component of the matrix criterion or (2) no, the panelist does not meet the component of the matrix criterion. An answer of "yes" may correspond to a first type of indicator being placed in the matrix, for example, a "1," and an answer of "no" may correspond to a second type of indicator being placed in the matrix, for example, a "0." The example indicator matrix generator 110 populates the indicator matrix with the different types of indicators for each of the panelists 102 corresponding to the result of the evaluation of the matrix criteria. Each of the panelists 102 corresponds to a panelist vector (e.g., a row) which contains a position (e.g., a column) in the vector for the determined indicators for each of the matrix criteria. Each column defines an element vector such that the indicators in the element vector correspond to a same matrix criterion. The indicator matrix created by the example indicator matrix generator 110 is a compilation of all of the panelist vectors for each of the panelists 102 in the sample set. The example indicator matrix generator 110 is described in further detail in conjunction with FIG. 2 below.

The example matrix reducer 112 of the data partitioner 106 of FIG. 1 reduces the indicator matrix generated by the example indicator matrix generator 110 to the set of unique panelist vectors (e.g., unique rows of indicators). For example, the matrix reducer 112 evaluates the panelist vectors to determine a set of unique panelist vectors representative of all of the panelist vectors in the indicator matrix. The set of unique vectors determined by the matrix reducer 112 corresponds to the minimum set of mutually exclusive partitions for the given set of panelist data.

The minimum set of mutually exclusive partitions may vary based on the panelists 102 and the given matrix criteria. For example, two sets of panelist data evaluated using the same matrix criteria may result in two different minimum sets of mutually exclusive partitions. In some such examples, if the matrix criteria being evaluated include gender of the panelist and whether or not the panelist has a cell phone, the mutually exclusive partitions may include "male with cell phone," "male without cell phone," "female with cell phone," "and female without cell phone," or any subset of those partitions listed, depending on the panelist data. In some examples, a data set may not include any panelists that fulfill a particular combination of the matrix criteria and, thus, that combination of matrix criteria would not be represented in the minimum set of mutually exclusive partitions for that data set. For example, the data may not contain a male panelist without a cell phone and, thus, the "male without cell phone" partition would not be included among the set of mutually exclusive partitions. The minimum set of mutually exclusive partitions can be used to reproduce the data from the sample of panelists 102. For example, any information a user wishes to obtain from the panelist data may be obtained using the set of mutually exclusive partitions because every outcome of panelist data present in the sample is represented in the minimum set of mutually exclusive partitions. In some examples, the matrix reducer 112 may, instead, reduce the indicator matrix to a set of panelist vectors matching a specific outcome. For example, the user may only want to see the partitions for panelists that have a cell phone.

The example panelist labeler 114 of FIG. 1 receives the reduced indicator matrix (e.g., the unique vectors representing the minimum set of mutually exclusive partitions) from the example matrix reducer 112 and assigns each of the unique vectors in the minimum set of mutually exclusive partitions a corresponding label. In the illustrated example, the mutually exclusive partitions are labeled with a letter (A, B, C, D, etc.). In other examples, the label may be a number, a word, and/or a combination of words, numbers, letters, symbols, etc. The matrix labeler 114 of the illustrated example also labels any panelist vectors matching a unique vector with a corresponding label. In some examples, the example panelist labeler 114 sorts the panelist vectors according to matching unique vectors prior to the panelist vectors being labeled by the example panelist labeler 114.

Additionally, the matrix labeler 114 may attach a description to each of the previously labeled mutually exclusive partitions to indicate the characteristics of the panelists 102 belonging to each mutually exclusive partition.

The example panelist sorter 116 of FIG. 1 sorts the labeled panelist vectors into groups according to the label assigned to each of the panelist vectors. For example, the matrix sorter 116 may sort the panelists 102 to enable more efficient subsequent processing of the panelist data by allowing the user to select which partitions are to be presented as processed panelist data 108. In some examples, the example matrix sorter 116 may sort the panelists 102 into groups and determine the number of panelists 102 in each group. The panelist sorter 116 outputs a list of processed panelist data 108 based on the sorted groups of panelists 102. In some examples, input from the user indicates how the panelist sorter 116 presents the list of processed panelist data 108. In other examples, the processed panelist data 108 may include all of the labeled panelist vectors.

The processed panelist data 108 of the illustrated example is a list or table of the minimum set of mutually exclusive partitions. Each mutually exclusive partition may be paired with a description indicating the type of panelists 102 that are included in the partition. In some examples, the processed panelist data 108 may be the entire indicator matrix. Alternatively, the processed panelist data may include any subset of the indicator matrix, such as all the panelists 102 in a specific partition. The processed panelist data 108 may be used in other data processing methods that may include weighting the partitions to obtain a more accurate representation of a larger population (e.g., the universe) based on the sample of panelists 102. Some such example methods, apparatus, and systems that utilize partitioned data are disclosed in U.S. patent application Ser. No. 14/835,401, filed Aug. 25, 2015 entitled Reducing Processing Requirements to Correct for Bias in Ratings Data Having Interdependencies Among Demographic Statistics, which is hereby incorporated by reference in its entirety.

In operation the example panelist data storage 104 receives data from the example plurality of panelists 102. Data from the example panelists 102 may be gathered using one or more methods (e.g., portable meter devices, surveys, set top boxes instrumented with meters, etc.). The data gathered from the example panelists 102 is stored in the example panelist data storage device 104. To enable the panelist data to be used effectively, the panelist data is evaluated by the example data partitioner 106. In particular, the example indicator matrix generator 110 of the data partitioner 106 evaluates the panelist data by generating an indicator matrix. The example indicator matrix generator 110 defines the matrix parameters (e.g., the number of rows and columns for the indicator matrix based on the set of matrix criteria and the number of panelists 102) of the indicator matrix, determines indicators for each of the panelists 102 based on each of the matrix criteria, and populates the indicator matrix with the indicators. The example matrix reducer 112 reduces the matrix to a minimum set of mutually exclusive partitions. The mutually exclusive partitions contain all of the combinations of the matrix criteria under evaluation for the given population of the example panelists 102. The example panelist labeler 114 then labels the partitions (e.g., using the labels A, B, C, D, etc.). In some examples, the panelists 102 in each mutually exclusive partition are also labeled accordingly (e.g., using corresponding labels A, B, C, D, etc.). The example panelist sorter 116 sorts the panelists 102 based on the label(s) to output the example processed panelist data 108.

Figure 2:
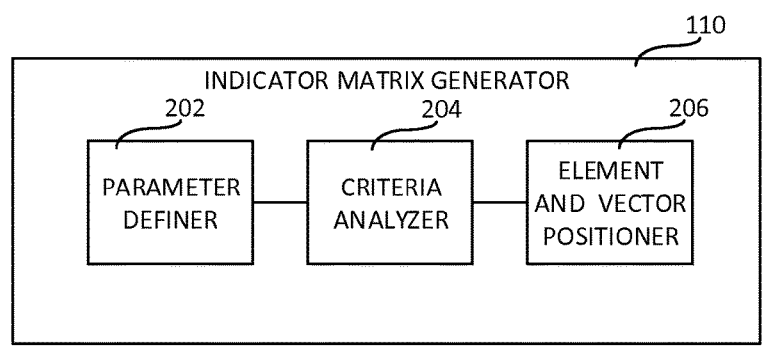
FIG. 2 is a block diagram of an example implementation of the indicator matrix generator of FIG. 1.

FIG. 2 is a block diagram of an example implementation of the indicator matrix generator 110 of FIG. 1. The example indicator matrix generator 110 shown in FIG. 2 includes an example parameter definer 202, an example criteria analyzer 204, and an example element and vector positioner 206.

The example parameter definer 202 of FIG. 2 defines matrix parameters of an indicator matrix based on a number of the received matrix criteria and a number of the example panelists in a plurality of panelists 102. In the illustrated example, the parameter definer 202 assigns a row (e.g., a panelist vector) in the indicator matrix for each of the example panelists 102. The example parameter definer 202 determines the number of columns (e.g., element vectors) of the indicator matrix based on the number of provided matrix criteria, with each matrix criterion being assigned two columns. The first element vector for a matrix criterion corresponds to whether each of the panelists 102 has a first characteristic (e.g., the condition of a probability) associated with the matrix criterion and a second element vector for the matrix criterion corresponds to whether each of the panelists 102 has the first characteristic (e.g., the condition of a probability) associated with the matrix criterion and the second characteristic (e.g., the event). In some examples, such as the example illustrated herein in FIG. 6, the element vector 622 for matrix criterion 502 may be located to the right of the second element vector 620 for matrix criterion 502 in an example indicator matrix 604.

The example criteria analyzer 204 of FIG. 2 evaluates each of the panelists 102 based on the received matrix criteria (which are/is a probability or a conditional probability) to determine whether or not the panelist has the first characteristic and/or the second characteristic. In the illustrated example, each matrix criterion has an associated first indicator corresponding to whether a panelist has the first characteristic (e.g., the condition) of a probability and an associated second indicator corresponding to whether the panelist has the first characteristic and the second characteristic (e.g., the event and the condition) of the example matrix criterion. The criteria analyzer 204 determines the first indicator based on whether or not the panelist has the second characteristic (e.g., the condition). The example criteria analyzer 204 determines the second indicator based on whether or not the panelist has the first characteristic and the second characteristic (e.g., the event and the condition). In other examples, each of the matrix criteria may only have one corresponding indicator. In such examples, the criteria analyzer 204 may determine the indicator based on whether the panelist has both the first and the second characteristics. In such examples, if the panelist does not have both the first and second characteristics, the panelist is assigned an indicator indicating that the panelist does not meet the corresponding matrix criterion.

The example element and vector positioner 206 of the illustrated example places an indicator (e.g., a 1 or a 0) in a location of the indicator matrix corresponding to the panelist and the matrix criterion being evaluated to indicate whether or not a panelist meets the matrix criterion. Each of the example panelists 102 corresponds to a panelist vector defined by the indicators placed in the location (e.g., the row) of the indicator matrix corresponding to the panelist and each of the matrix criteria evaluated. Each panelist vector contains indicator(s) for all of the matrix criteria evaluated for each of the panelists 102.

While an example manner of implementing the example data partitioner 106 of FIG. 1 is illustrated in FIGS. 1 and/or 2, one or more of the elements, processes and/or devices illustrated in FIGS. 1 and/or 2 may be combined, divided, re-arranged, omitted, eliminated and/or implemented in any other way. Further, the example parameter definer 202, the example criteria definer 204, the example element and vector positioner 206, the example indicator matrix generator 110, the example matrix reducer 112, the example panelist labeler 114, the example panelist sorter 116, and/or, more generally, the example data partitioner 106 of FIG. 1 may be implemented by hardware, software, firmware and/or any combination of hardware, software and/or firmware. Thus, for example, any of the example parameter definer 202, the example criteria definer 204, the example element and vector positioner 206 the example indicator matrix generator 110, the example matrix reducer 112, the example panelist labeler 114, the example panelist sorter 116, and/or, more generally, the example data partitioner 106 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example parameter definer 202, the example criteria definer 204, the example element and vector positioner 206 the example indicator matrix generator 110, the example matrix reducer 112, the example panelist labeler 114, the example panelist sorter 116, and/or, more generally, the example data partitioner 106 is/are hereby expressly defined to include a tangible computer readable storage device or storage disk such as a memory, a digital versatile disk (DVD), a compact disk (CD), a Blu-ray disk, etc. storing the software and/or firmware. Further still, the example data partitioner 106 of FIG. 1 may include one or more elements, processes and/or devices in addition to, or instead of, those illustrated in FIG. 2, and/or may include more than one of any or all of the illustrated elements, processes and devices.

Figure 3:
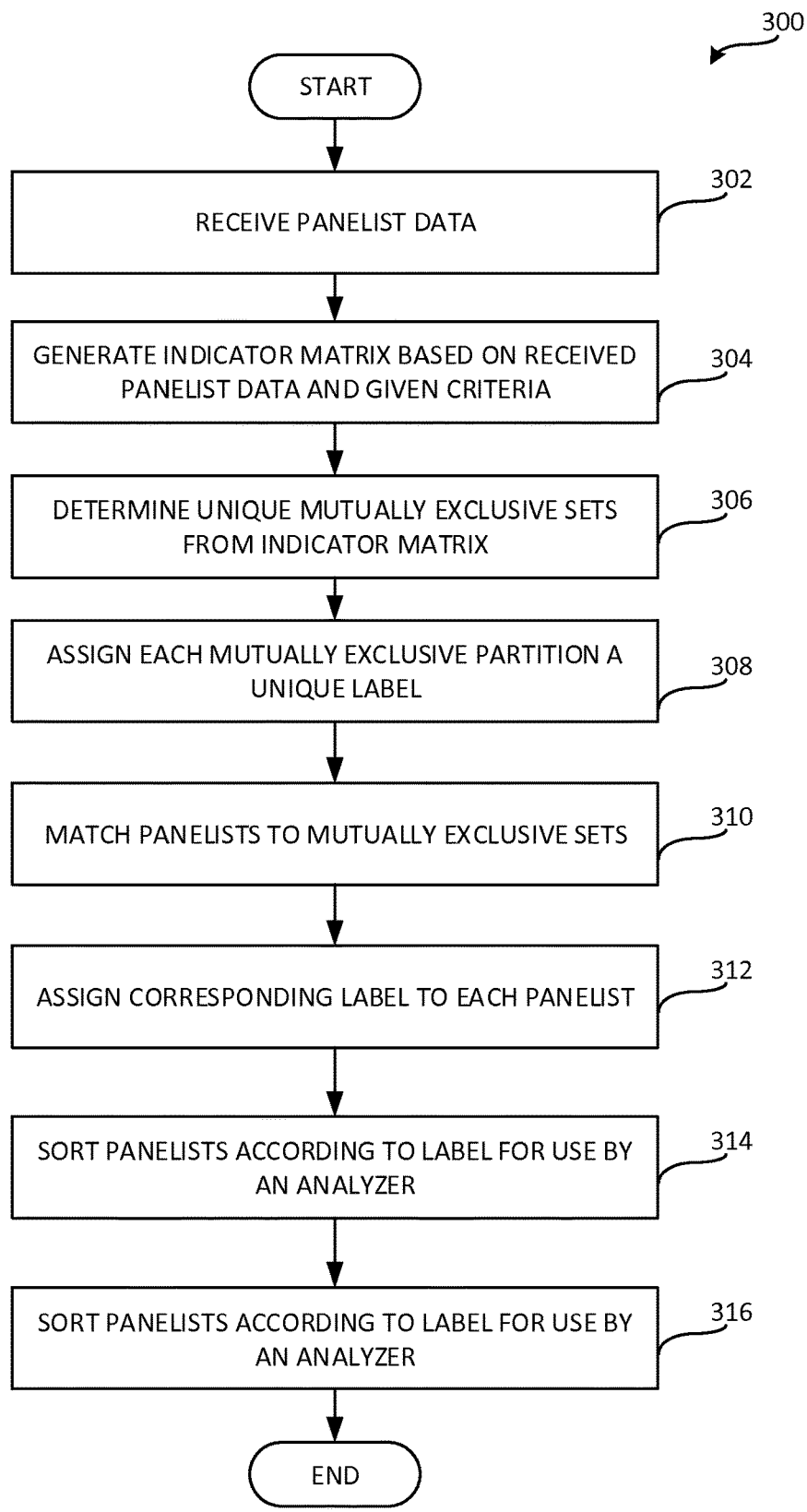
FIG. 3 is a flowchart representative of example machine readable instructions that may be executed to implement the example data partitioner of FIG. 1.
Figure 4:
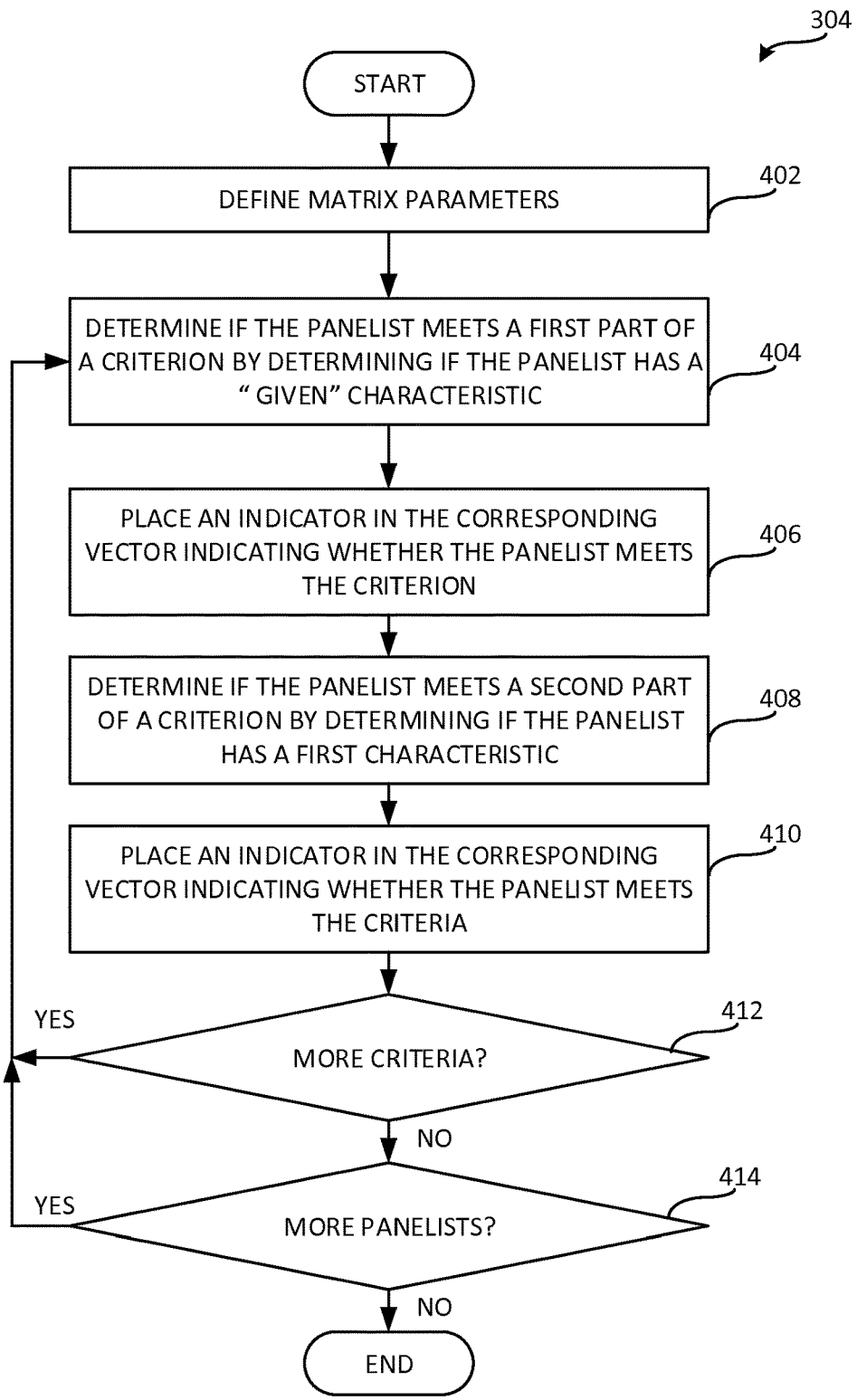
FIG. 4 is a flowchart representative of example machine readable instructions that may be executed to implement the example indicator matrix generator of FIGS. 1 and/or 2.

A flowchart representative of example machine readable instructions for implementing the example data partitioner 106 of FIGS. 1 and/or 2 is shown in FIGS. 3 and 4. In this example, the machine readable instructions comprise a program for execution by a processor such as the processor 1112 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIGS. 3 and/or 4, many other methods of implementing the example data partitioner 106 may alternatively be used. For example, the order of execution of the blocks may be changed, and/or some of the blocks described may be changed, eliminated, or combined.

As mentioned above, the example processes of FIGS. 3 and 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 3 and 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 3 is a flowchart representative of example machine readable instructions 300 that may be executed to implement the example data partitioner 106 of FIGS. 1 and/or 2. The instructions begin when the example indicator matrix generator 110 of the example data partitioner 106 receives panelist data from the example panelist data storage device 104 (block 302). The example indicator matrix generator 110 generates an indicator matrix based on the panelist data and the supplied matrix criteria (e.g., matrix criteria that includes probabilities input by a survey administrator) (block 304). Example instructions that are executed to generate an indicator matrix are described below in connection with the flowchart of FIG. 4. Based on the generated indicator matrix, a unique set of mutually exclusive partitions is determined by the example matrix reducer 112 (block 306). The example panelist labeler 114 assigns a unique label to each of the mutually exclusive partitions (block 308). The example panelist sorter 116 matches one of the example panelists 102 to corresponding ones of the example mutually exclusive partitions (block 310). The example panelist labeler 114 assigns each of the panelists 102 a label corresponding to the mutually exclusive partition to which the panelist was matched (block 312). The example panelist sorter 116 sorts panelists according to the assigned label for later use such as, for example, weighting the partitions (block 314). In some examples, the full data may be discarded in favor of the summarized data for the partitions (block 316). In other examples, the reduction of data may not be performed. The program of FIG. 3 is then complete.

FIG. 4 is a flowchart representative of example machine readable instructions 304 that may be executed to generate an indicator matrix for received matrix criteria and a set of panelist data (e.g., data for the example panelists 102). The example instructions 304 begin with the example parameter definer 202 defining the matrix parameters of the indicator matrix based on the panelists 102 and the given matrix criteria (block 402). The example criteria analyzer 204 determines if a first panelist of the plurality of panelists 102 meets an event of a matrix criterion by determining if the first panelist fulfills the condition (block 404). The example element and vector positioner 206 places an indicator in the location of the indicator matrix (e.g., the first element vector for the matrix criterion) corresponding to the first panelist and the event of the matrix criterion that indicates whether or not the first panelist meets the event of the matrix criterion (block 406). The example criteria analyzer 204 determines if the first panelist meets a condition of the matrix criterion by determining if the first panelist fulfills the event and the condition of the matrix criterion (block 408). The example element and vector positioner 206 places an indicator in the location of the indicator matrix (e.g., the second element vector for the matrix criterion) corresponding to the panelist and the condition of the matrix criterion that indicates whether or not the first panelist meets the condition of the matrix criterion (block 410).

The example indicator matrix generator 110 determines if there are more matrix criteria to be evaluated for the first panelist (block 412). If more matrix criteria exist, control returns to block 404 to evaluate the first panelist based on a next matrix criterion. If no further matrix criteria exist, the example indicator matrix generator 110 determines if there are more of the panelists 102 to be evaluated (block 414). If there are more of the panelists 102 to be evaluated, control returns to block 404 to evaluate the next panelist based on the matrix criteria. If no further panelists 102 are to be evaluated, the indicator matrix is complete, and control returns to block 306 of the flowchart of FIG. 3 to process the indicator matrix.

FIG. 5 is an example set of matrix criteria 500 that may be received by the example indicator matrix generator 110. For example, the example set of matrix criteria 500 may be received via input from an operator. As shown in FIG. 5, the example set of matrix criteria 500 is given in a probability format. For example, for a matrix criterion 502 (e.g., P(Male Cell Phone)), the example criteria analyzer 204 evaluates each data corresponding to each of the panelists 102 to determine which the panelists 102 has a cell phone (e.g., the condition), then determines which of the set of panelists with cell phones are male (e.g., the event). As a further example, another matrix criterion 504 reads P(Male), which does not include a condition. In such examples, the condition is understood to include all panelists in the set of panelists. In examples where there is only one characteristic (e.g., the event) listed, the example criteria analyzer 204 records that the panelist is one of the panelists of the set of panelists 102 being analyzed, then determines if the panelist has the listed characteristic (e.g., if the panelist is male). Other sets of the matrix criteria 500 may include any number of matrix criteria relating to any kind of data or characteristic of the set of panelists 102 to be evaluated.

FIG. 6 is an example table 600 including an example set of panelists 602 and an example indicator matrix 604 that may be generated by the example indicator matrix generator 110 of FIGS. 1 and/or 2. The example indicator matrix 604 has been determined using the example set of matrix criteria 500 of FIG. 5 and an example set of panelists 602. Each panelist of the set of panelists 602 includes an example identification number 606, example gender data 608 designating the panelist's gender, and example cell phone data 610 designating whether the panelist has a cell phone. The element vectors 612-634 correspond to the matrix criteria of FIG. 5 and are populated with indicators 636 and 638 based on whether the each of the example plurality of panelists 602 meets each of the set of matrix criteria 500. Panelist vectors, such as the panelist vector 640 for the first panelist, are created by the row indicators corresponding to each of the panelists. For example, element vectors 620 and 622 (e.g., columns N3 and D3) correspond to the matrix criterion 502 shown in FIG. 5.

Each matrix criterion of the set of matrix criteria 500 corresponds to two element vectors 612-634 in the example indicator matrix 604. For example, element vector 620 (e.g., N3) corresponds to the event of matrix criterion 502 of the set of matrix criteria 500 in FIG. 5 and element vector 622 (e.g., D3) corresponds to the condition of matrix criterion 502 of the set of matrix criteria 500 in FIG. 5. The indicator in matrix criterion element vector 620 relates to whether the event and condition of matrix criterion 502 (e.g., male and cell phone) are met and the indicator in matrix criteria element vector 622 relates to whether the condition of matrix criterion 502 (e.g., cell phone) is met. Thus, because a panelist 642 (e.g., the panelists corresponding to the identification number 606 of "10") is female and has a cell phone, an indicator of "1" 636 is placed in a location of the element vector 622 (D3) corresponding to panelist 10 because panelist 10 fulfils the condition of the matrix criterion 502 (e.g., having a cell phone). An indicator of "0" 638 is placed in a location of the element vector 620 (N3) corresponding to panelist 10 because panelist 10 does not also fulfill the event of the matrix criterion 502 (e.g., being male). Each panelist of the example set of panelists 602 is evaluated based on the example set of matrix criteria 500 and the determined indicators are placed in the corresponding locations of element vectors 612-634 to complete the example indicator matrix 604. In other examples, the panelists 602 may correspond to columns and the matrix criteria may correspond to rows. Any number of panelists 602 may be added to the indicator matrix and evaluated based on the example set of matrix criteria 500.

FIG. 7 is an example set of partitioned data 700 that may be determined using the examples described herein. The example set of partitioned data 700 in the illustrated example is the minimum set of mutually exclusive partitions of the indicators in the element vectors 612-634 of the example indicator matrix 604 of FIG. 6. Thus, the example partitioned data 700 is the minimum set of mutually exclusive partitions that can be used to represent the panelist data in evaluating the example set of matrix criteria 500. A label column 702 has been added to the set of partitioned data 700 for the labels 704-710. The labels for the example set of partitioned data 700 are letters (e.g., A, B, C, and D), but in other examples, other types of labels may be used.

FIG. 8 is an example set of panelist data 800 that is matched in accordance with the partitions of FIG. 7. The example identification number 606, gender data 608, and cell phone data 610 are present in the example set of panelist data in the illustrated example. In other examples, the example set of panelist data that is matched in accordance with the partitions of FIG. 7 may only include the identification number 606. The panelists 602 have been assigned a label corresponding to the mutually exclusive partition of the example set of partitioned data 700 of FIG. 7 to which the panelist was matched.

FIG. 9 is an example set of panelist data 900 that is sorted in accordance with the partitions of FIG. 7. The example set of panelist data 900 illustrated in FIG. 9 has been sorted based on the panelists 602 that have a particular label 702. In this example, the label is "B," but other labels may be used in other examples.

FIG. 10 is an example set of partition descriptions 1000 in accordance with the examples described herein. The description column 1002 includes example partition descriptions 1004-1010, which are determined based on the characteristics of the panelists 602 corresponding the each label 702. In other examples, the descriptions may be based on other characteristics included in the panelist data.

Figure 11:
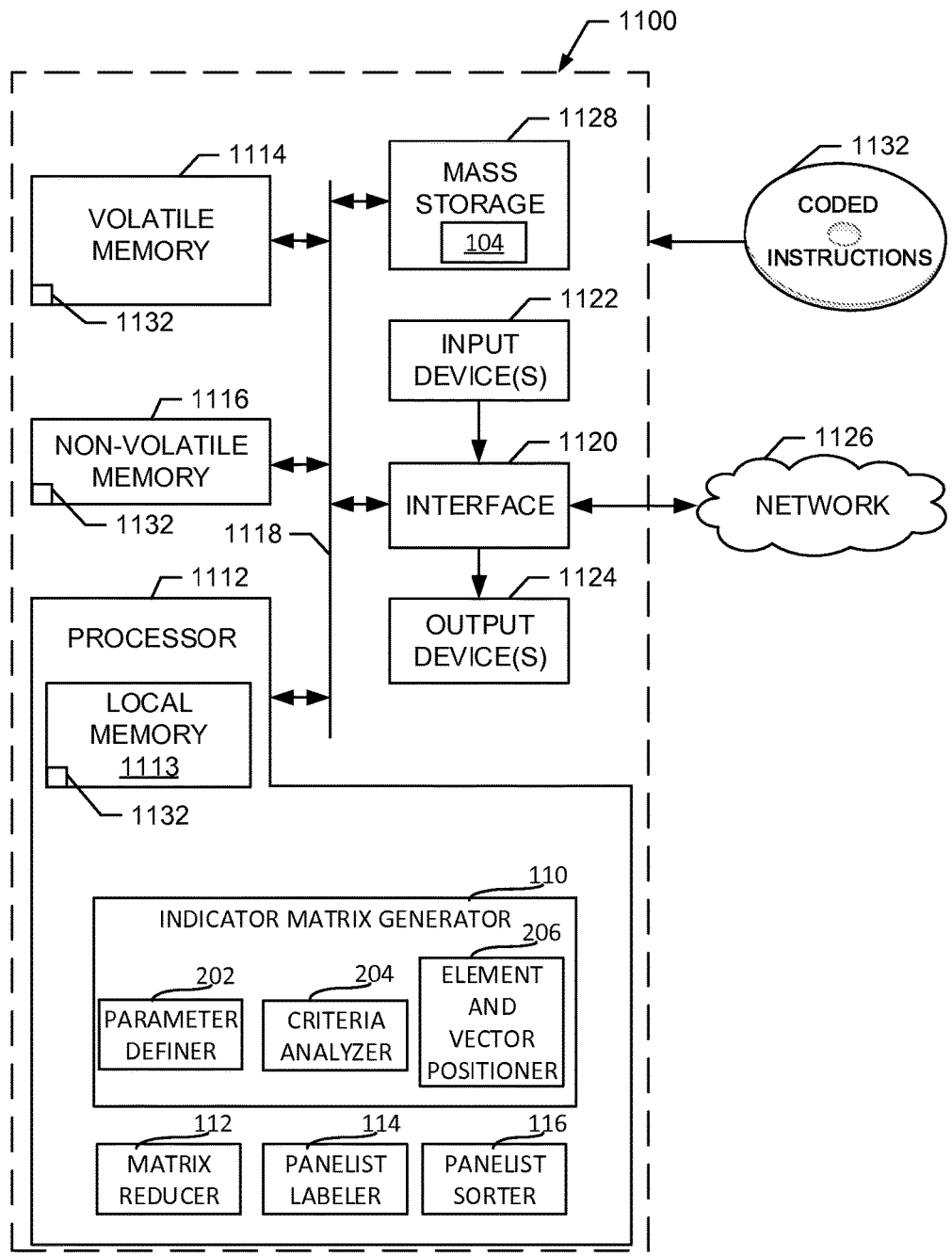
FIG. 11 is a block diagram of an example processor platform structured to execute the example machine-readable instructions of FIGS. 3 and 4 to implement the example data partitioner and/or indicator matrix generator of FIGS. 1 and/or 2.

FIG. 11 is a block diagram of an example processor platform 1100 capable of executing instructions to implement at least a portion of the methods 300 and 304 of FIGS. 3 and 4. The processor platform 1100 can be, for example, a server, a personal computer, a mobile device (e.g., a cell phone, a smart phone, a tablet such as an iPad™), a personal digital assistant (PDA), an Internet appliance or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. In this example implementation, the processor 1112 includes the indicator matrix generator 106, the matrix reducer 108, the panelist labeler 110 and the panelist sorter 112. The indicator matrix generator 106 further includes the parameter definer 202, the criteria analyzer 204, and the element and vector positioner 206.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) 1122 can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 688 include floppy disk drives, hard drive disks, compact disk drives, Blu-ray disk drives, RAID systems, and digital versatile disk (DVD) drives. One particular example of a mass storage device is the panelist data storage 104.

Coded instructions 1132 to implement at least a portion of the methods 300 and 304 of FIGS. 3 and 4 may be stored in the mass storage device 628, in the volatile memory 1114, in the non-volatile memory 1116, and/or on a removable tangible computer readable storage medium such as a CD or DVD.

Above disclosed methods, apparatus and articles of manufacture provide the benefit of reducing the amount of data that must be stored in relation to a set of panelist data, thus reducing burdens on a processor and/or memory. For example, instead of a larger amount of data being stored for each panelist (e.g., gender, whether the panelist has a cell phone, geographic location, etc.), a label corresponding to a partition (e.g., a partition from the minimum set of mutually exclusive partitions defined from the data set) is stored and the full set of data may be discarded thereby greatly reducing storage space usage. In contrast to previous methods of determining mutually exclusive partitions for a set of data that determine all possible mutually exclusive partitions, some example methods and apparatus disclosed herein determine the minimum set of mutually exclusive partitions of the data set that can satisfy the matrix criteria (e.g., provide answers to the matrix criteria probabilities), which further reduces the amount of data stored and the burden on the processor. For example, a data set may contain data related to 10,000 panelists and 4 mutually exclusive partitions may be defined from the data set. In this example, the data corresponding to the 10,000 panelists, which may include 2 different characteristics, can be reduced to 4 partitions, which may include a partition label and a number of panelists in the partition, thus reducing the amount of information stored from 20,000 data elements (e.g., 2 characteristics for each of 10,000 panelists) to 4 data elements. In some examples, a description may be stored in addition to the label. Simply storing a label indicating a partition to which the panelist belongs can expedite future data processing for the set of panelist data because the full set of data will not have to be re-evaluated for use. Moreover, the size of the data set to be processed is reduced, thereby reducing the usage of computer storage and the burden on the processor and improving the overall operating efficiency of the corresponding computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to reduce data storage requirements for panelist data stored in memory comprising:
generating, with a processor, an indicator matrix for a set of the panelist data stored in a memory by:
determining a first matrix criterion including a first and second panelist characteristic, the first matrix criterion being a probability that a panelist has the first characteristic given that the panelist has the second characteristic;
determining a second matrix criterion including a third and fourth panelist characteristic, the second matrix criterion being a probability that the panelist has the third characteristic given that the panelist has the fourth characteristic;
determining a first set of entries to be placed in a first element vector based on the first matrix criterion, the first set of entries including an entry for each respective panelist in the set of panelist data, each entry in the first set of entries to indicate whether each respective panelist has both the first panelist characteristic and the second panelist characteristic;
determining a second set of entries to be placed in a second element vector based on the first matrix criterion, the second set of entries including an entry for each respective panelist in the set of panelist data, each entry in the second set of entries to indicate whether each respective panelist has the second panelist characteristic;
determining a third set of entries to be placed in a third element vector based on the second matrix criterion, the third set of entries including an entry for each respective panelist in the set of panelist data, each entry in the third set of entries to indicate whether each respective panelist has both the third panelist characteristic and the fourth panelist characteristic;
determining a fourth set of entries to be placed in a fourth element vector based on the second matrix criterion, the fourth set of entries including an entry for each respective panelist in the set of panelist data, each entry in the fourth set of entries to indicate whether each respective panelist has the fourth panelist characteristic, the entries of the first, second, third, and fourth sets of entries corresponding to a same panelist and defining a panelist vector for the panelist, the panelist vectors and the element vectors defining the indicator matrix;
determining, with the processor, a set of unique panelist vectors, each unique panelist vector including a unique combination of the first, second, third, and fourth entries present in the indicator matrix; and
removing, with the processor, the set of panelist data and redundant panelist vectors that are not unique from the memory to determine a set of partitions of the panelist data to thereby reduce the data storage requirement for the panelist data.

2. The method of claim 1, further including:
matching a subset of the panelist vectors with a matching one of the partitions to create a group of matching panelists;
determining a fifth characteristic for each of the matching panelists, the fifth characteristic not included in the element vectors; and
assigning a label of the one of the partitions to the panelists in the group.

3. The method of claim 2, further including creating descriptions for the labels.

4. The method of claim 3, wherein the descriptions include a respective matrix criterion included in the partition corresponding to the label.

5. The method of claim 2, further including sorting the panelists based on the labels.

6. The method of claim 1, further including receiving the first matrix criterion and the second matrix criterion based on a user input.

7. The method of claim 1, wherein a number of the element vectors utilized in the indicator matrix corresponds to a number of matrix criteria to be analyzed.

8. The method of claim 1, further including sorting the partitions based on labels assigned to the partitions.

9. A tangible computer readable storage medium comprising instructions that, when executed, cause a machine to at least:
 generate, with a processor, an indicator matrix for a set of panelist data stored in a memory by:
  determining a first matrix criterion including a first and second panelist characteristic, the first matrix criterion being a probability that a panelist has the first characteristic given that the panelist has the second characteristic;
  determining a second matrix criterion including a third and fourth panelist characteristic, the second matrix criterion being a probability that the panelist has the third characteristic given that the panelist has the fourth characteristic;
  determining a first set of entries to be placed in a first element vector based on the first matrix criterion, the first set of entries including an entry for each respective panelist in the set of panelist data, each entry in the first set of entries to indicate whether each respective panelist has both the first panelist characteristic and the second panelist characteristic;
  determining a second set of entries to be placed in a second element vector based on the first matrix criterion, the second set of entries including an entry for each respective panelist in the set of panelist data, each entry in the second set of entries to indicate whether each respective panelist has the second panelist characteristic;
  determining a third set of entries to be placed in a third element vector based on the second matrix criterion, the third set of entries including an entry for each respective panelist in the set of panelist data, each entry in the third set of entries to indicate whether each respective panelist has both the third panelist characteristic and the fourth panelist characteristic;
  determining a fourth set of entries to be placed in a fourth element vector based on the second matrix criterion, the fourth set of entries including an entry for each respective panelist in the set of panelist data, each entry in the fourth set of entries to indicate whether each respective panelist has the fourth panelist characteristic, the entries of the first, second, third, and fourth sets of entries corresponding to a same panelist and defining a panelist vector for the panelist, the panelist vectors and the element vectors defining the indicator matrix;
 determine, with the processor, a set of unique panelist vectors, each unique panelist vector including a unique combination of the first, second, third, and fourth entries present in the indicator matrix; and
 remove, with the processor, the set of panelist data and redundant panelist vectors that are not unique from the memory to determine a set of partitions of the panelist data to thereby reduce the data storage requirement of the panelist data.

10. The storage medium of claim 9, wherein the instructions further cause the machine to:
 match a subset of the panelist vectors with a matching one of the partitions to create a group of matching panelists;
 determine a fifth characteristic for each of the matching panelists, the fifth characteristic not included in the element vectors; and
 assign a label of the one of the partitions to the panelists in the group.

11. The storage medium of claim 10, wherein the instructions further cause the machine to create descriptions for the labels.

12. The storage medium of claim 11, wherein the descriptions include a respective matrix criterion included in the partition corresponding to the label.

13. The storage medium of claim 12, wherein the instructions further cause the machine to sort the panelists based on the labels.

14. The storage medium of claim 12, wherein the instructions further cause the machine to sort the partitions based on labels assigned to the partitions.

15. The storage medium of claim 9, wherein the instructions further cause the machine to receive the first matrix criterion and the second matrix criterion based on a user input.

16. The storage medium of claim 9, wherein a number of the element vectors utilized in the indicator matrix corresponds to a number of matrix criteria to be analyzed.

17. A data partitioner for partitioning panelist data stored in memory comprising:
 an indicator matrix generator to generate an indicator matrix for a set of panelist data stored in a memory by:
  determining a first matrix criterion including a first and second panelist characteristic, the first matrix criterion being a probability that a panelist has the first characteristic given that the panelist has the second characteristic;
  determining a second matrix criterion including a third and fourth panelist characteristic, the second matrix criterion being a probability that the panelist has the third characteristic given that the panelist has the fourth characteristic;
  determining a first set of entries to be placed in a first element vector based on the first matrix criterion, the first set of entries including an entry for each respective panelist in the set of panelist data, each entry in the first set of entries to indicate whether each respective panelist has both the first panelist characteristic and the second panelist characteristic;
  determining a second set of entries to be placed in a second element vector based on the first matrix criterion, the second set of entries including an entry for each respective panelist in the set of panelist data, each entry in the second set of entries to indicate whether each respective panelist has the second panelist characteristic;
  determining a third set of entries to be placed in a third element vector based on the second matrix criterion, the third set of entries including an entry for each respective panelist in the set of panelist data, each entry in the third set of entries to indicate whether each respective panelist has both the third panelist characteristic and the fourth panelist characteristic;
  determining a fourth set of entries to be placed in a fourth element vector based on the second matrix criterion, the fourth set of entries including an entry for each respective panelist in the set of panelist data, each entry in the fourth set of entries to indicate whether each respective panelist has the fourth panelist characteristic, the entries of the first, second, third, and fourth sets of entries corresponding to a same panelist and defining a panelist vector for the panelist, the panelist vectors and the element vectors defining the indicator matrix; and
 a matrix reducer to determine a set of unique panelist vectors, each unique panelist vector including a unique combination of the first, second, third, and fourth entries present in the indicator matrix, and remove the set of the panelist data and redundant panelist vectors from the memory that are not unique to determine a set of partitions of the panelist data to thereby reduce the data storage requirement for the panelist data.

18. The data partitioner of claim 17, further comprising:

the indicator matrix generator to determine a fifth characteristic for each of the matching panelists, the fifth characteristic not included in the element vectors;

a panelist sorter to match a subset of the panelist vectors with a matching one of the partitions to create a group of matching panelists; and a panelist labeler to assign a label of the one of the partitions to the panelists in the group.

19. The apparatus of claim 17, further including a data partitioner to receive the first matrix criterion and the second matrix criterion based on a user input.

20. The apparatus of claim 19, wherein the panelist labeler is to create descriptions for the labels.

* * * * *